United States Patent [19]

Sekiya et al.

[11] Patent Number: 5,207,990

[45] Date of Patent: May 4, 1993

[54] EXHAUST GAS PURIFYING DEVICE FOR INTERNAL COMBUSTION ENGINE

[75] Inventors: Yoshiki Sekiya; Tetsuya Kamihara; Eiji Aiyoshizawa, all of Kanagawa, Japan

[73] Assignee: Nissan Motor Co., Ltd., Yokohama, Japan

[21] Appl. No.: 707,506

[22] Filed: May 30, 1991

[30] Foreign Application Priority Data

Jun. 1, 1990 [JP] Japan .................. 2-143500

[51] Int. Cl.⁵ ............................ F01N 3/22; F01N 9/00
[52] U.S. Cl. ............................ 422/183; 422/169; 422/182; 60/286; 60/303
[58] Field of Search ............... 422/169, 182, 183; 60/286, 303

[56] References Cited

U.S. PATENT DOCUMENTS

| | | | |
|---|---|---|---|
| 4,372,111 | 2/1983 | Virk et al. | 422/183 X |
| 4,875,336 | 10/1989 | Hayashi et al. | 60/286 |
| 4,974,414 | 12/1990 | Kono et al. | 60/286 |
| 5,052,178 | 10/1991 | Clerc et al. | 422/169 X |
| 5,067,320 | 11/1991 | Kanesaki | 422/169 X |

FOREIGN PATENT DOCUMENTS 0198318 10/1985 Japan .................. 60/286
61-173712 10/1986 Japan .

Primary Examiner—Robert J. Warden
Assistant Examiner—Stephanie Blythe
Attorney, Agent, or Firm—Lowe, Price, LeBlanc & Becker

[57] ABSTRACT

An exhaust gas purifying device which is provided with catalytic converter and a fuel injector which are disposed upstream of a particulate matter trap. The fuel injection injects fuel to the catalytic converter to rise exhaust gas temperature by its oxidation reaction heat when the exhaust gas temperature is slightly lower than a predetermined regeneration temperature. Further, a closable bypass passage is communicated with the passage between the catalytic converter and the trap and functions to allow to bypass exhaust gases in accordance with the trap condition and the exhaust gas temperature.

8 Claims, 8 Drawing Sheets

EXHAUST GAS PURIFYING DEVICE FOR INTERNAL COMBUSTION ENGINE

BACKGROUND OF THE INVENTION

1. Field of the invention

The present invention relates to improvements in an internal combustion engine exhaust system, and more particularly to an exhaust gas purifying device for reducing particulate matter.

2. Description of the Prior Art

Various types of exhaust gas purifying devices in a diesel engines have been proposed. Major types of them are provided with traps for trapping particulate matter in order to prevent the particulate matter from exhausting into atmosphere. The trap is periodically regenerated by reburning the particulate matter to avoid the degradation of the engine performance.

One of typical devices is disclosed, for example, in Japanese Utility Model Provisional Publication No. 61-173712, in which the exhaust gas purifying device is provided with a bypass passage which is disposed at the upstream side of a trap. This device is further provided with an oxidation catalytic converter in the bypass passage in order to provide a reaction heat to the trap by means that fuel is supplied upstream of the oxidation catalytic converter and generates the reaction heat with unburnt gases. Since it is difficult that the trap is regenerated at a lower temperature than 400° C., fuel is supplied to the catalytic converter to rise the exhaust gas temperature by the oxidation reaction heat.

However, difficulties have been encountered in the above-discussed system, in which the system presents a condition that the exhaust gas temperature is lower than a regeneration temperature even if the fuel is supplied to the catalytic converter. If such a condition is maintained, particulate matter is further accumulated in the trap and the vehicular performance is largely degraded. Further, the supplied fuel into the exhaust gas is incompletely burnt and transformed into white smoke.

SUMMARY OF THE INVENTION

It is an object of the present invention to provide an improved exhaust gas purifying device which prevents the generation of white smoke and the degradation of a trap.

Another objection of the present invention is to provide an exhaust gas purifying device by which SOF (Soluble Organic Factor) is completely purified and the regeneration period is extended in a normal driving condition of the engine having this device.

As shown in FIG. 1, according to the present invention, an exhaust gas purifying device for an internal combustion engine comprises an exhaust conduit, a fuel injection nozzle, a catalytic converter, a bypass passage, an exhaust gas sensor, a trap, a regeneration controller, and a bypass valve.

An exhaust gas purifying system for an internal combustion engine in accordance with the present invention comprises a catalytic converter disposed in an exhaust conduit of the engine. Fuel supply means supplies fuel to an upstream side of the catalytic converter. The fuel supply means takes one of an operative state and an inoperative state. A trap is disposed in the exhaust conduit downstream of the catalytic converter to trap particulate matter contained in exhaust gas. A bypass passage is connected at its upstream end with the exhaust conduit between the catalytic converter and the trap. A bypass valve is disposed in the bypass passage and is operable to take one of a closing state to close the bypass passage and an opening state to open the bypass passage. Exhaust gas temperature detecting means detects exhaust gas temperature in the exhaust conduit upstream of the trap. Control means controls fuel supply of the fuel supply means and operation of the bypass valve in accordance with the exhaust gas temperature detected by the gas temperature detecting means.

With this arrangement, the fuel amount for the regeneration of the trap is controlled in accordance with the exhaust gas temperature in the event of the regeneration time of the trap. Therefore, the oxidation reaction heat by the fuel is utilized to the burning of the accumulated particulate matter. When the exhaust gas temperature is as high a self ignition temperature, the supply of fuel is stopped to avoid the heat damage of the trap. Further, when the exhaust gas temperature is lower than the regeneration temperature although the fuel is supplied to the catalytic converter, the supply of the fuel is stopped to prevent the generation of white smoke and the bypass valve is opened to prevent the drivability of the engine from being degraded.

Additionally, the system is arranged to proceed the following operations in accordance with the engine conditions. For example, SOF is purified by the oxidation catalytic converter when the engine is operated in a normal condition. The bypass valve is closed so that the exhaust gas bypasses the trap when the engine is operated in a low- engine speed and a low engine-load condition. And the exhaust gas is flowed to the trap when the engine is operated over a normal driving condition. Therefore, the trap is prevented from excessively trapping particulate matter and is accelerated to reburn the trapped particulate matter. This improves a fuel consumption and a drivability upon improving a regeneration performance and extending a regeneration interval.

DETAILED DESCRIPTION OF THE INVENTION

Figure 1:
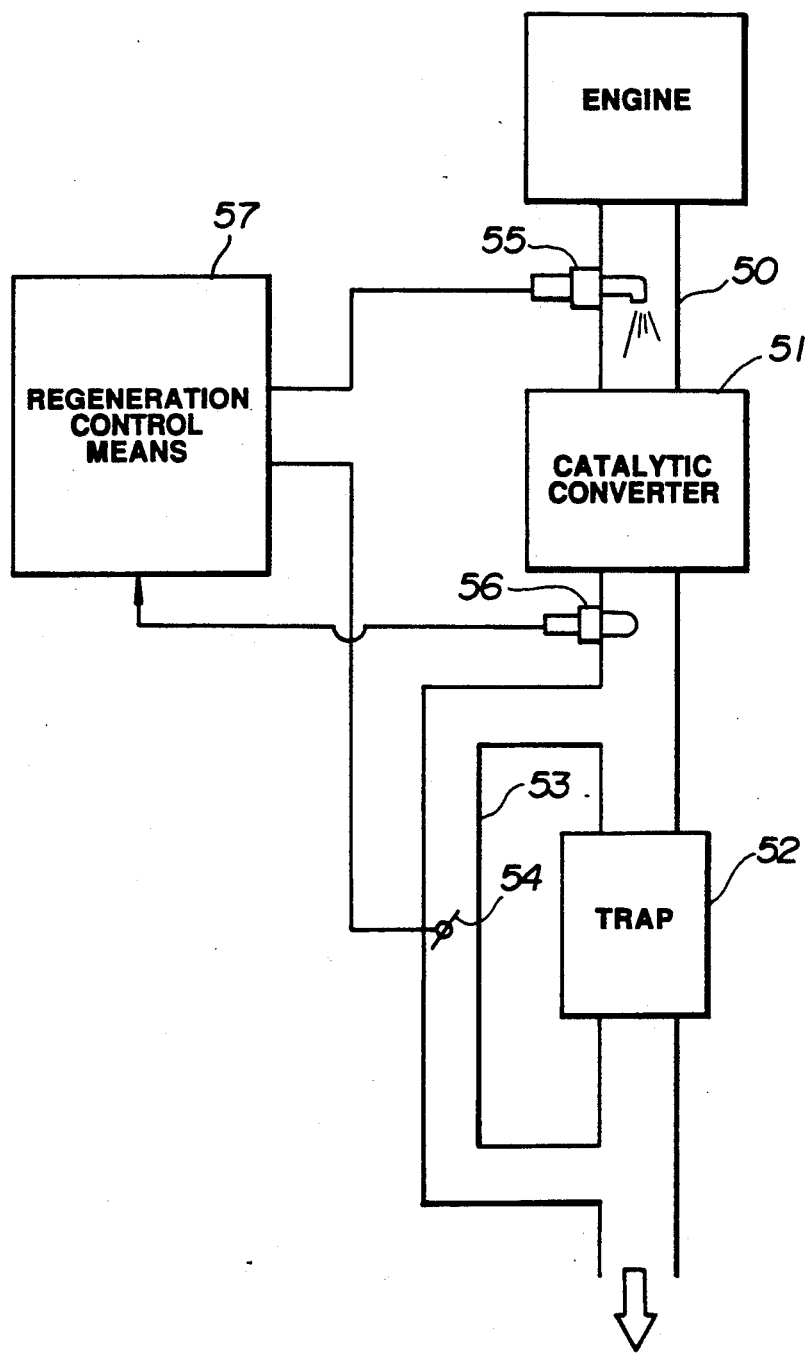
FIG. 1 is a schematic block diagram showing the conceptual arrangement of the present invention.
Figure 2:
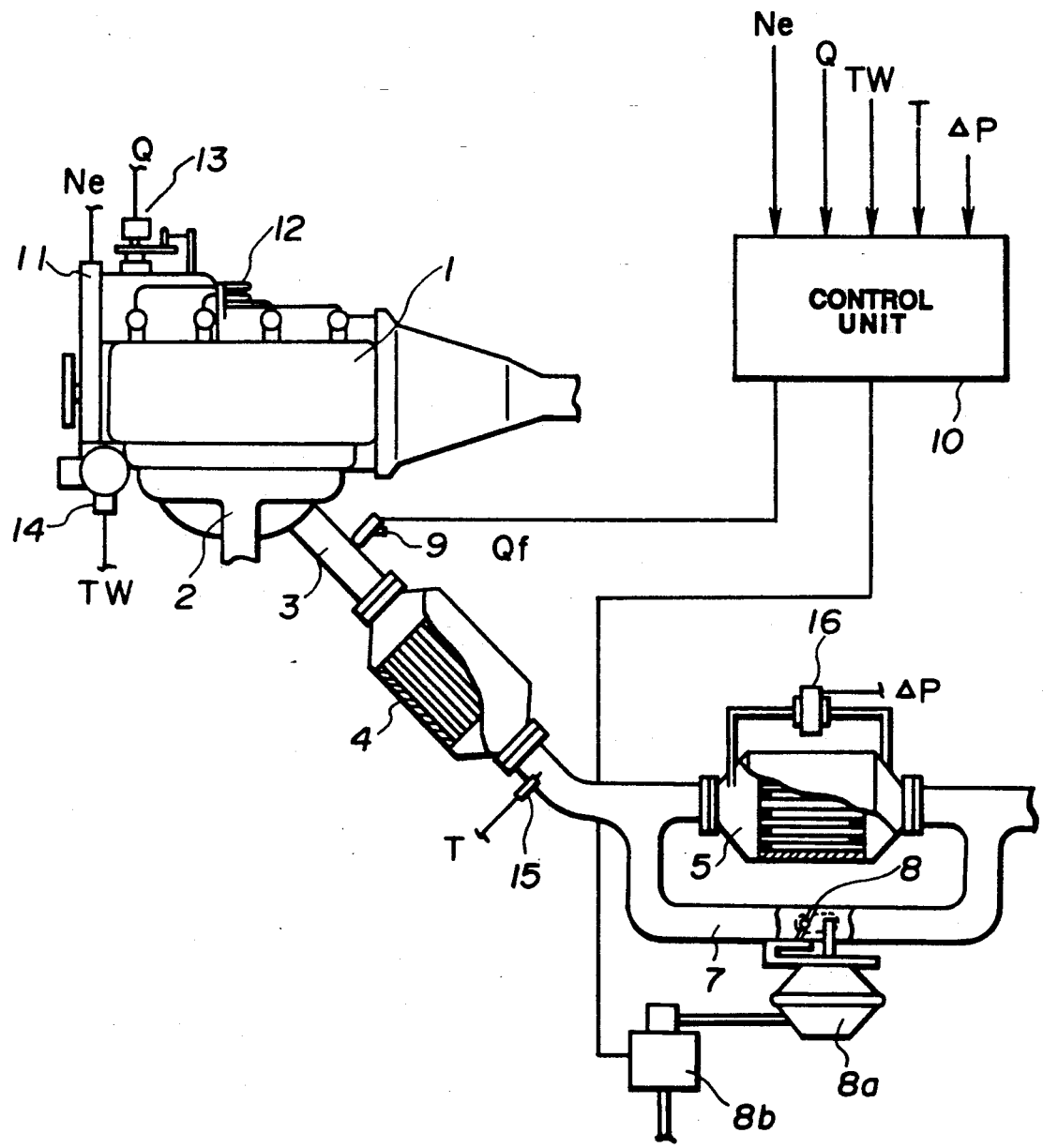
FIG. 2 is a plan view showing an engine system equipped with a first embodiment of an exhaust gas purifying system according to the present invention.

Referring now to FIG. 2, a first embodiment of an exhaust gas purifying device of an internal combustion engine 1 according to the present invention is illustrated by reference character D. The internal combustion engine 1 is provided with an intake conduit 2 and an exhaust conduit 3. A fuel injection valve 9 is disposed in the exhaust conduit 3 to inject fuel into the exhaust conduit 3. A catalytic converter 4 is disposed downstream of the fuel injection valve 4 in order to purify the exhaust gas. A thermocouple type temperature sensor 15 for detecting the temperature T of the exhaust gas is disposed in the exhaust conduit 3 and downstream of the catalytic converter 4. The temperature sensor 15 is arranged to determine the inlet gas temperature T which prevails at the upstream side of the trap 3. The exhaust conduit 3 downstream of the temperature sensor 15 is divided into a main passage 3a and a bypass passage 7.

A trap 5 for trapping particulate matter is disposed in the main passage 3a. A semiconductor type pressure sensor 16 is arranged to sense the pressure differential ΔP which develops across the trap. The pressure differential sensor 16 is disposed in a conduit which communicates an upstream side of the trap 5 and a downstream side of the trap 5. A bypass valve 7 is disposed in the bypass passage 7 and operatively connected with a vacuum servo motor 8a. A solenoid valve 8b is arranged to control the supply of negative pressure into the vacuum servo motor 8a of this device. A cranking sensor 11 is arranged to detect the rotational speed Ne of the engine. A pump throttle sensor 13 for an fuel injection pump 12 is arranged to output a signal Q indicative of accelerator pedal depression. An engine coolant temperature sensor 14 is arranged to output a signal Tw to a control unit 10. The control unit 10 contains a microprocessor which responds to the outputs of the above mentioned sensors and appropriately outputs driver signals to the fuel injection valve 9 and the three way solenoid valve 8b.

The manner of operation of the thus arranged exhaust gas purifying system will be discussed hereinafter according to the flow chart of FIG. 3.

The control unit 10 reads the signals Ne, Q, Tw, ΔP and T in a step S1 and judges in a step S2 whether the trap 5 is in a regenerating condition or not. When the trap 5 is not in a regenerating condition, in a step S3 it is judged whether the trap 5 should be regenerated or not in a manner that the pressure differential ΔP of the trap 5 is in the allowable range. When it is judged in the step S3 that the trap 5 should be regenerated, the routine proceeds to a step S4 wherein a regeneration time flag is set.

In a step S6 it is judged whether or not the coolant water temperature Tw is higher than or equal to 60° C. When the coolant water temperature Tw is higher than or equal to 60° C., as being judged the engine has finished its warming up, the routine proceeds to a step S7 wherein or not it is judged whether the exhaust gas temperature T is higher than or equal to 300° C. (the lower limit temperature of the catalyzer activities). In the step S7 when the exhaust gas temperature T is higher than or equal to 300° C., the routine proceeds to a step S8 wherein the bypass valve 8 is closed and the control unit 10 starts counting of the regenerating time and it is judged whether or not the exhaust gas T is higher than or equal to 400° C. (an upper limit temperature of fuel injection). When the exhaust gas temperature T is lower than 400° C., the routine proceeds to a step S10 wherein the fuel injection amount Qf is determined in accordance with the map disclosed in FIG. 4b in which the fuel injection amount Qf is mapped in correspondence with the rotational number of the engine. the determined fuel injection amount Qf is injected from the fuel injection valve 9.

In the step S6, when the coolant water temperature Tw is lower than 60° C., the routine proceeds to a step S17 wherein it is judged whether or not the exhaust gas temperature T is higher than or equal to 400° C. In the step S17, when the exhaust gas temperature T is higher than or equal to 400° C., the routine proceeds to a step S18 wherein the bypass valve 8 is closed and the counting of the regeneration time is started. Further, the program proceeds to a step S12. On the other hand, in the step S17, when the exhaust gas temperature T is lower than 400° C., the program jumps to a step S16 wherein the bypass valve is opened in order to prevent the particulate matter from accumulating on the trap 5.

In the step S12, it is judged whether the counting of the regeneration time is proceeded to a predetermined value. When the counting of the regeneration time is not proceeded to a predetermined value, the program is returned to the start and repeats the same step until the counting of the regeneration time is proceeded to the predetermined time. When the counting of the regeneration time is proceeded to a predetermined valve in the step S12, the program proceeds to a step S19 wherein the counting of the regeneration time and the regenerating time flag are cleared.

Figure 5:
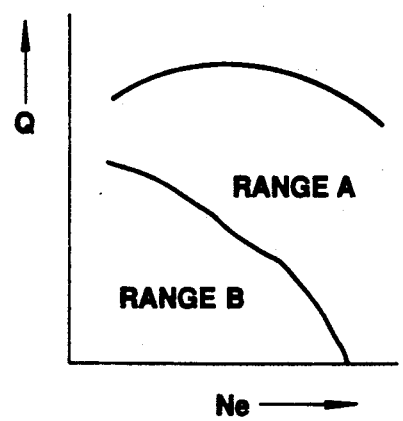
FIG. 5 is a graph showing an operating range of a bypass valve used in the first embodiment of the present invention.

In a step S14, it is judged whether or not the engine condition is in a range A (a condition that a high engine-rotation and a high engine-load as show in FIG. 5). When the engine condition is in the range A, the program proceeds to a step S15 wherein the bypass valve 8 is closed. When the engine condition is not in the range A, the program proceeds to a step S16 wherein the bypass valve 8 is opened.

When the engine is operated under a high engine-load and a high engine-rotation speeds condition such as the range A, the engine generates a lot of particulate matters. Accordingly, the bypass valve 8 is closed so that all of the exhaust gas flows into the trap 5 and the particulate matters are trapped by the trap 5. On the other hand, when the engine is operated in a low engine-load condition such as in a range B, the engine generates a lot of SOF and almost none of particulate matter such as carbon particles. Accordingly, the bypass valve 8 is opened and the SOF is oxidized in the oxidation catalytic converter 4.

Next referring to FIGS. 4 to 7, the manner of operation of the first embodiment of the present invention will be further discussed hereinafter.

Figure 6:
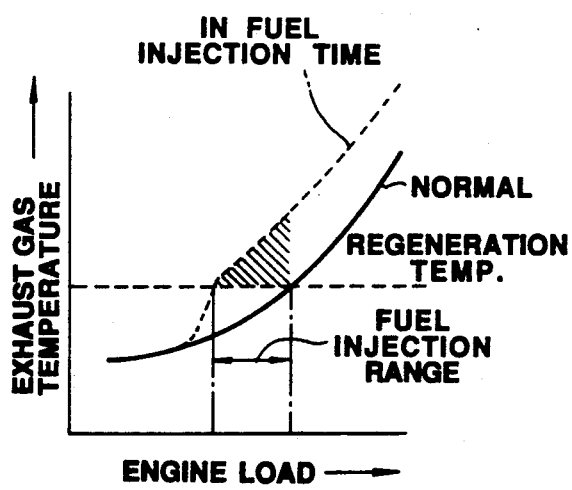
FIG. 6 is a graph showing a rising of an exhaust gas temperature when fuel is injected for the regeneration in the first embodiment of the present invention.
Figure 7:
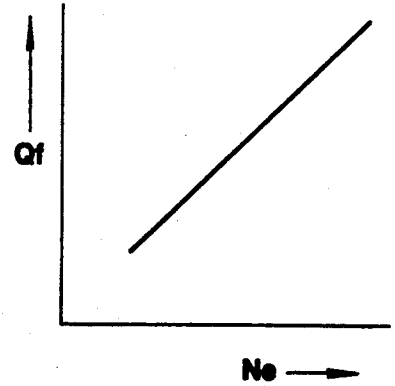
FIG. 7 is a graph showing a fuel injection amount for the regeneration in the first embodiment of the present invention.
Figure 8:
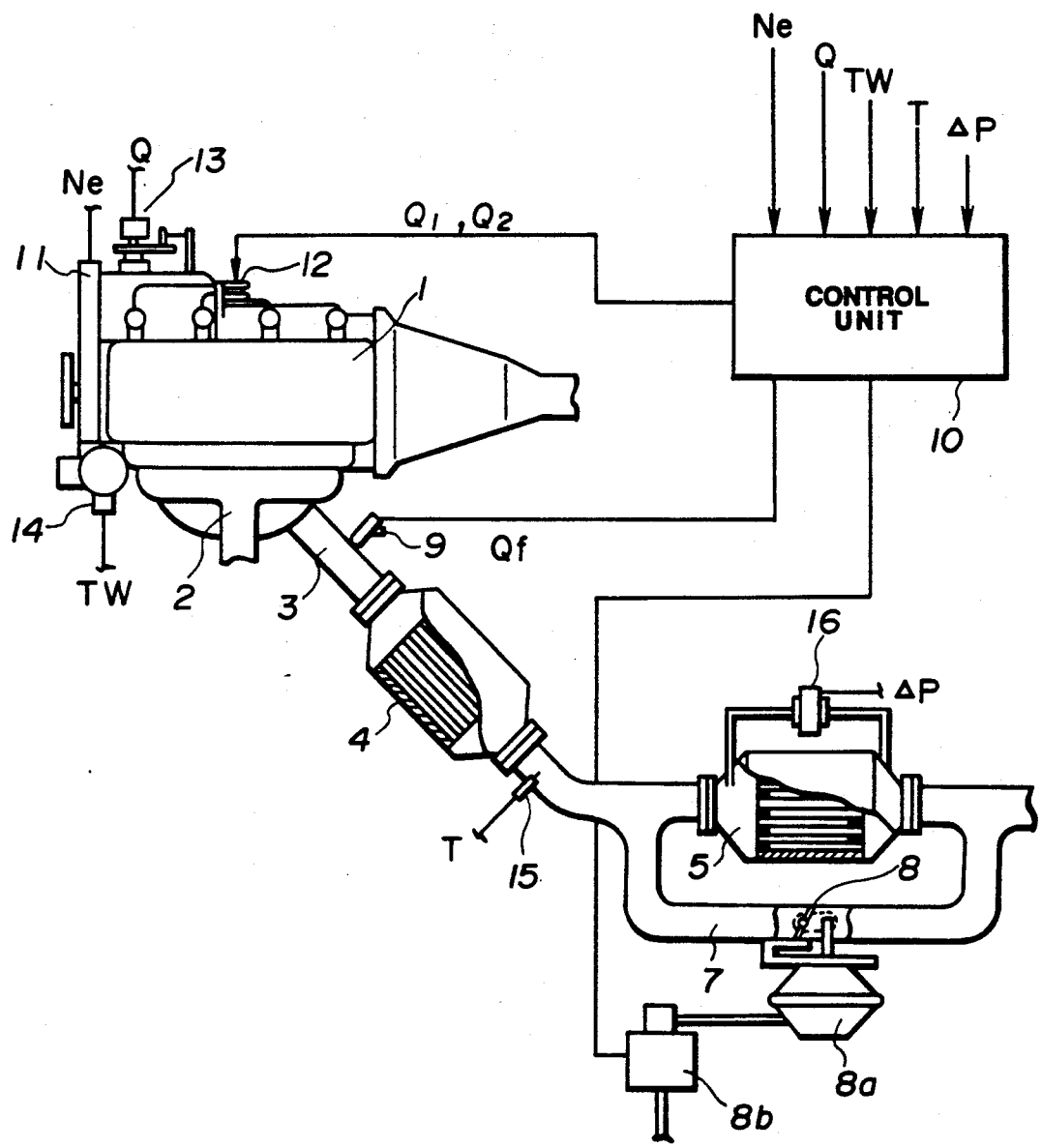
FIG. 8 is a plan view showing an engine system equipped with a second embodiment of an exhaust gas purifying system according to the present invention.

When the particulate matter in the trap 5 becomes larger than a predetermined value, the regeneration is started. In the event that exhaust gas is in the range from 300° to 400° C., the regeneration is carried out upon injecting the fuel from the fuel injection valve 9. When the exhaust gas temperature is kept at 300° C. or above in the downstream side of the oxidation catalytic converter 4, the oxidation reaction efficiency of the fuel is in 90% or above. Accordingly, the supplied fuel is generally completely burnt and occurs the heat by the oxidation reaction. With the oxidation reaction, the exhaust gas temperature rises to the temperature at which the trap 5 is adequately regenerated as shown in FIG. 6, so that the particulate matter in the trap 5 which is mainly composed of carbon particles is smoothly fired and burnt. Further, since the supplied fuel is simultaneously oxidized in the trap 5, white smoke formed by incompletely oxidizing the supplied fuel is prevented from generating and exhaust into atmosphere.

On the other hand, when the exhaust gas temperature rises over 400° C., the supply of the fuel is stopped and the regeneration is started. The particulate matter in the trap 5 is oxidized in the high temperature circumstance without supplying the fuel to the upstream side of the oxidation catalytic converter 4. Furthermore, since the bypass valve 8 closes the bypass passage so that all of the exhaust gas is flowed to the trap 5, a lot of heat generated by burning the particulate matter is carried away by the forcible flow of the exhaust gas. Therefore, the trap 5 is prevented from being damaged by the special firing caused by the burning of the particulate matter.

Further, when the exhaust gas temperature is not higher than 300° C. or the engine has not finished its warming up, the fuel supplied to the upstream side of the oxidation catalytic converter 4 is not completely oxidized but is exhausted as a white smoke. Therefore, under this condition, the regeneration of the trap 5 is not operated even if the trap 5 is in a condition that the trap 5 should be regenerated. However, under such a condition, the particulate matter is further accumulated in the trap 5 and the engine performance is degraded. Therefore, under this condition, in order to avoid the degradation of the engine performance, the bypass valve 8 is opened until the exhaust gas rises to an adequate temperature for the regeneration.

Since the range where the exhaust gas temperature is not higher than 300° C. is generally corresponding with the range B in FIG. 5, the low temperature exhaust gas flows through the oxidation catalytic converter 4 thereby preventing the engine from being degraded in its performance.

As shown in FIG. 5, when the engine is operated under a normal driving condition, that is, under a condition that the trap 5 is not regenerated, the bypass valve 8 is closed and the trap 5 accumulates the particulate matter under a high engine-load condition. On the other hand, under a low engine-load condition, in which SOF is rich in the exhaust gas, the exhaust gas is purified by passing through the oxidation catalytic converter while the engine keeps on good in its fuel consumption and drivability in a manner that the exhaust pressure differential is lowered by opening the bypass valve 8.

In the range where the exhaust gas flows into the trap 5 under a non-regenerating condition as shown in FIG. 5, since the exhaust gas temperature is higher than or equal to the regenerating temperature, the particulate matter in the trap 5 is automatically regenerated. Therefore, the regenerating cycle is extended and the degradation of the fuel consumption and drivability is largely suppressed.

A second embodiment according to the present invention will be discussed hereinafter referring to FIGS. 8 to 12.

The second embodiment of the exhaust gas purifying device is similar to the first embodiment except for fuel supplement device with which the fuel is injected at the upstream side of the oxidation catalytic converter. A fuel injection pump 12 for this device is made based on a distributor type pump. The fuel injection pump 12 is of a type which pumps fuel by means of reciprocating and rotating of a plunger 27 in timed relation with the rotation of the internal combustion engine. The fuel injection pump 12 is provided with an electronically controlled three-way solenoid valve 8b. The fuel injection pump 12 is utilized so that the injection timing and amount are varied by controlling an opening and closing of the three-way solenoid valve 8b.

Figure 9:
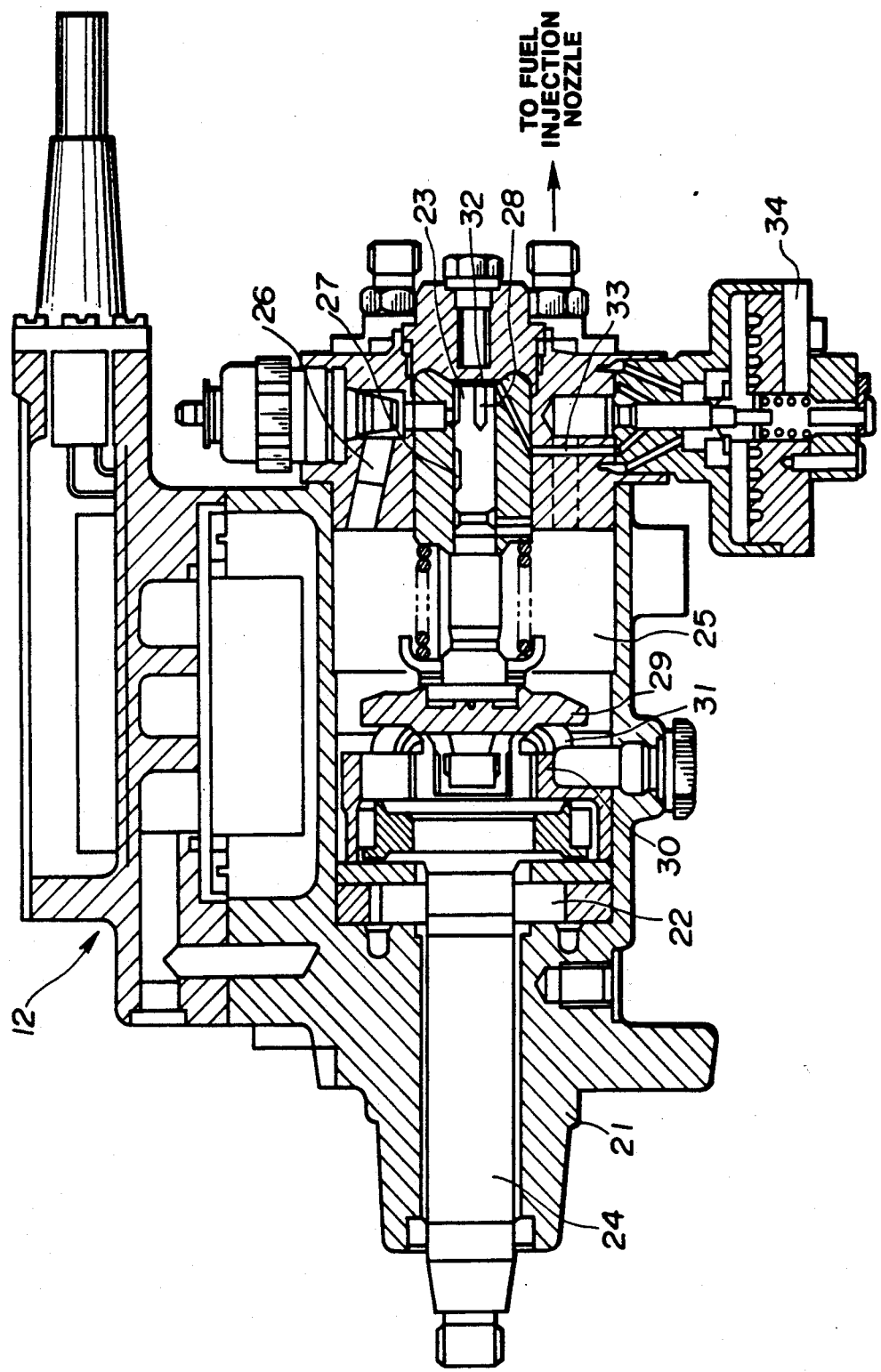
FIG. 9 is a cross-sectional view of a fuel injection pump used in the second embodiment of FIG. 8.

As concretely shown in FIG. 9, the fuel injection pump 12 is provided with a low pressure feed pump 22 and a high pressure plunger pump 23 which are disposed in a housing 21 and driven by a drive shaft 24. The feed pump 22 sucks the fuel from a fuel entrance (though not shown) and supplies the fuel into a pump chamber 25 of the housing 21. Further, the fuel is fed to the plunger pump 23 through a sucking passage 26 formed in the pump chamber 25. The plunger 27 of the plunger pump 23 is provided with sucking grooves 28 whose number is as same as the number of the cylinders of the engine and which extend to a tip end portion of the plunger 27 so as to be generally parallel with the axis of the plunger 27. A base end portion 27a of the plunger 27 is formed with a cam face 29 which has the same number of cam lobes as that of the sucking grooves 28. The face cam 29 is lifted by overcoming a roller 31 disposed in a roller ring 30 while being integrally rotated with the drive-shaft 24.

Since the plunger 27 is reciprocated while being rotated, the fuel sucked from the sucking grooves 28 to the plunger chamber 32 is pumped from the delivery port (not shown) through a delivery valve (no numeral) to each fuel injection nozzle of each cylinder.

An electromagnetic control valve 34 of a high-speed type is disposed between the plunger chamber 32 and a fuel returning circuit 33. The plunger chamber 32 is communicated and incommunicated with the fuel injection nozzle in timed relation to the opening and closing operations of the electromagnetic control valve 34. The fuel injection is started by the closing of the electromagnetic control valve 34 and accomplished by the opening of it in a compression stroke by the plunger 27. Therefore, fuel injection timing is decided by the closing timing of the electromagnetic control valve 34 and the fuel injection amount is decided by the closing period of the electromagnetic control valve 34.

Figure 11:
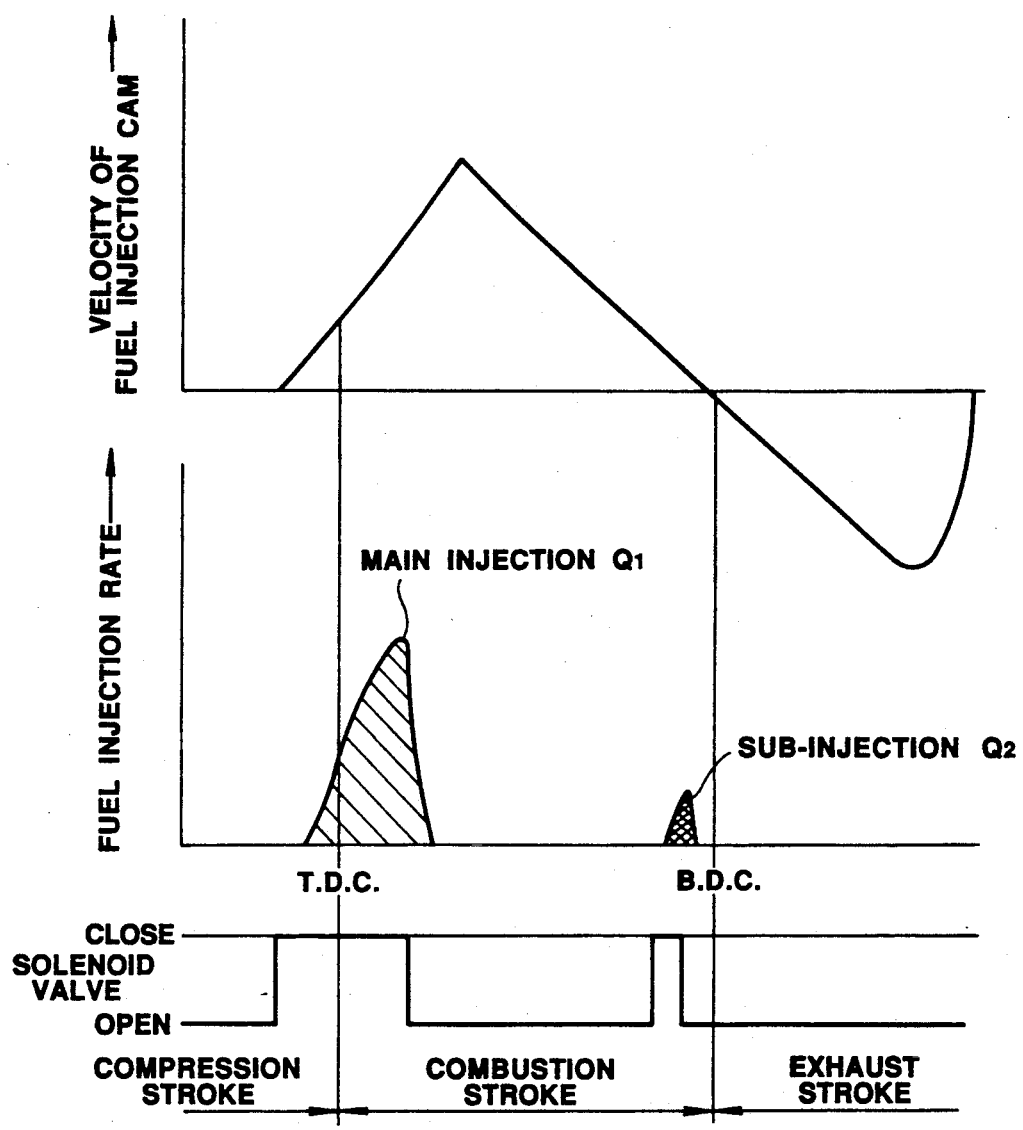
FIG. 11 is an operational diagram showing an fuel injection amount and timing of the fuel injection pump used in the second embodiment of FIG. 8.

As shown in FIG. 11, with the operations of the electromagnetic control valve 34 by the control unit 10, the fuel injection pump 12 is operated to inject a main injection Q1 when the engine is in the end of the compression stroke of the engine. Further, the fuel injection pump 12 is operated to inject a sub-injection Q2 when the engine is in a combustion stroke.

Since the sub-injection Q2 is injected at the time of the end of the combustion stroke of the engine, the fuel injected by the sub-injection Q2 is exhausted to the exhaust passage 3 without being generally burnt but remaining a lot of unburnt contents. Accordingly, when the unburnt fuel is carried to the oxidation catalytic converter, the activity of the unburnt fuel is remarkably accelerated by atomization of the fuel upon proceeding the oxidation reaction. Therefore, the reaction in the oxidation catalytic converter is smoothly carried out thereby preventing the white smoke from being occurred.

Figure 3:
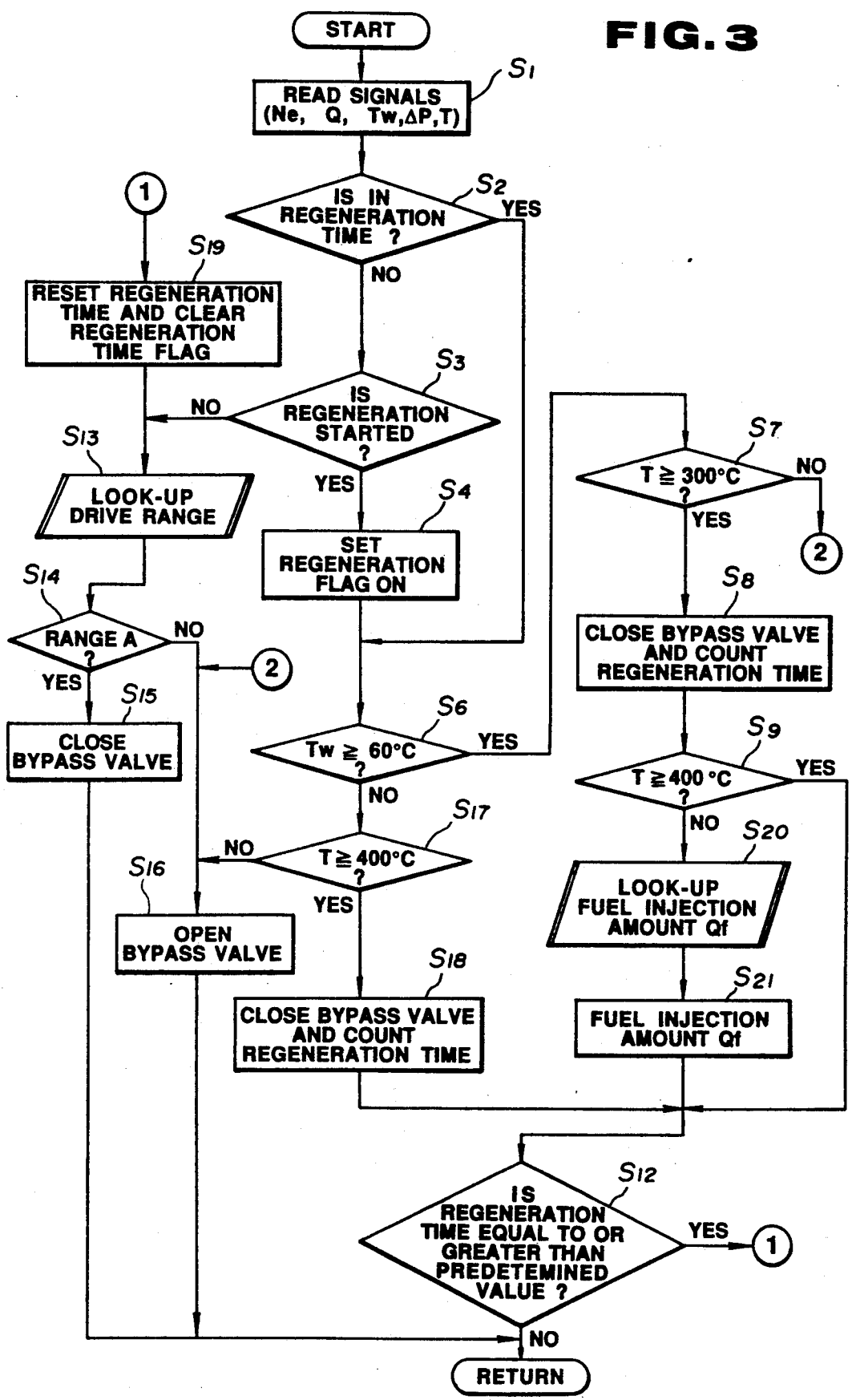
FIG. 3 is a flow chart showing a program of the first embodiment of the exhaust gas purifying system according to the present invention.
Figure 10:
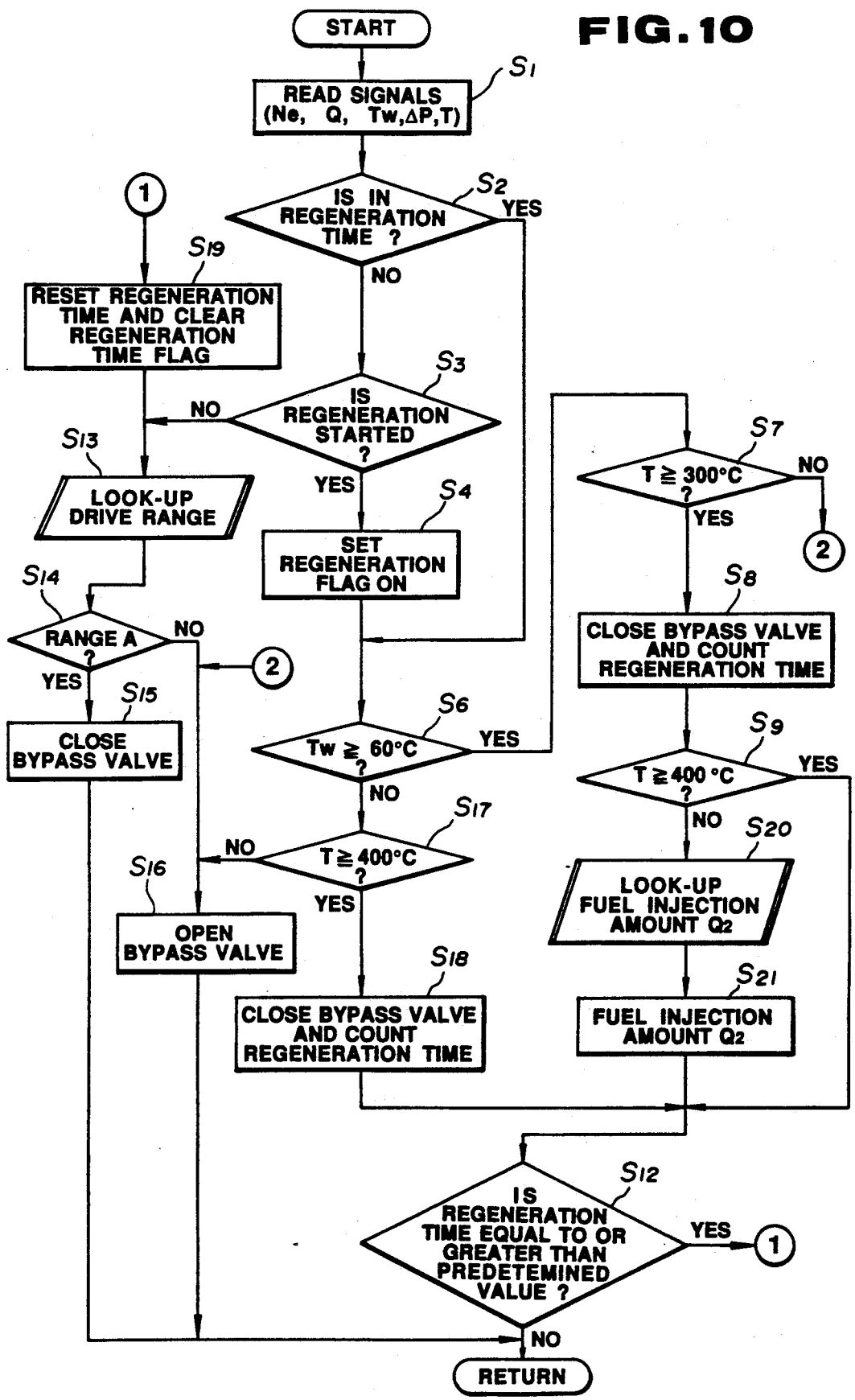
FIG. 10 is a flow chart showing a program of the second embodiment of FIG. 8.

The control method of the fuel injection pump 12 is shown in FIG. 10, which is similar to the first embodiment except for in the steps S20 and S21 corresponding to the step S10 and S11 of FIG. 3. In the steps S20 and S21, the fuel amount in the sub-injection Q2 is looked up and is injected at the time of the end of the combustion stroke of the engine.

Figure 12:
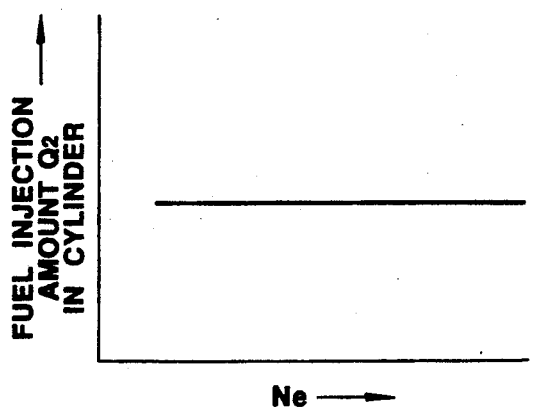
FIG. 12 is a graph showing a fuel injection amount for the regeneration in the second embodiment.

As similarly shown in FIG. 12, the fuel amount of the sub-injection Q2 is constant and the sub-injection Q2 is injected corresponding to rotational speed of the engine. With this setting, the fuel injection amount per an hour is increased corresponding to the increase of the rotational speeds of the engine. Accordingly, the fuel injection amount per hour by the injection pump 12 becomes generally same as the amount by the fuel injection characteristic shown in FIG. 7.

Accordingly, with the thus arranged exhaust gas purifying system of the second embodiment, the fuel for the regeneration for the trap 5 is effectively used without generating white smoke and it becomes possible to simplify its structure and to lower the producing cost.

Figure 4:
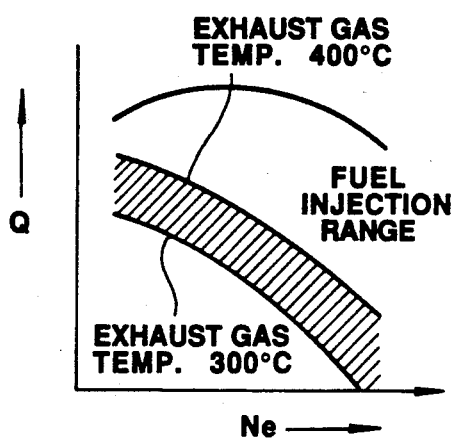
FIG. 4 is a graph depicting an fuel supplying range in a regeneration time, which is used in connection with the first embodiment of the present invention.

Furthermore, in the event that the trap 5 is not coated with a catalyzer, since it is necessary that the regeneration of the trap 5 carried out at about 600° C., the amount of the fuel injection may be controlled in accordance with the regeneration temperature of the trap 5 by shifting the fuel injection range in FIG. 4 to an upper side.

The various possible combinations of the above described embodiments and the variants thereof which will be obvious to those skilled in the instant art, are deemed well within the purview of the engineer skilled in the art of the engine control.

What is claimed is:

1. An exhaust gas purifying system for an internal combustion engine, comprising:
   a catalytic converter disposed in an exhaust conduit of an internal combustion engine;
   means for supplying fuel to an upstream side of said catalytic converter, said fuel supply means taking one of an operative state and an inoperative state;
   a trap disposed in the exhaust conduit downstream of said catalytic converter to trap particulate matter contained in exhaust gas;
   means defining a bypass passage whose upstream end is communicated with the exhaust conduit between said catalytic converter and said trap and whose downstream end is communicated with the exhaust conduit downstream of said trap;
   a bypass valve disposed in said bypass passage and operative to take one of a closing state to close the bypass passage and an opening state to open the bypass passage;
   means for detecting an exhaust gas temperature in the exhaust conduit between said catalytic converter and said trap;
   means for controlling fuel supply of said fuel supply means and operation of said bypass valve in accordance with the exhaust gas temperature detected by said gas temperature detecting means.

2. An exhaust gas purifying system for an internal combustion engine, comprising:
   a catalytic converter disposed in an exhaust conduit of an internal combustion engine;
   means for supplying fuel to an upstream side of said catalytic converter, said fuel supply means taking one of an operative state and an inoperative state;
   a trap disposed in the exhaust conduit downstream of said catalytic converter to trap particulate matter contained in exhaust gas;
   means defining a bypass passage whose upstream end is communicated with the exhaust conduit between said catalytic converter and said trap and whose downstream end is communicated with the exhaust conduit downstream of said trap;
   a bypass valve disposed in said bypass passage and operative to take one of a closing state to close the bypass passage and an opening state to open the bypass passage;
   means for detecting an exhaust gas temperature in the exhaust conduit between said catalytic converter and said trap;
   means for controlling fuel supply of said fuel supply means and operation of said bypass valve in accordance with the exhaust gas temperature detected by said gas temperature detecting means, said control means taking one of a first control state to put said fuel supply means into said operative state and to put said bypass valve into the closing state when the exhaust gas temperature is in a predetermined temperature range which is lower than a regeneration temperature, a second control state to put said fuel supply means into said inoperative state and to put said bypass valve into the closing state when the exhaust gas temperature is higher than the predetermined temperature range, and a third control state to put said fuel supply means into said inoperative state and to put said bypass valve into the opening state when the exhaust gas temperature is lower than the predetermined temperature range.

3. An exhaust gas purifying system a claimed in claim 2, wherein said control means controls said fuel supply means when engine coolant temperature is not lower than 60° C.

4. An exhaust gas purifying system as claimed in claim 1, further comprising an engine rotational speed sensor, a pump throttle sensor for outputting a signal indicative of accelerator pedal depression, an engine coolant temperature sensor for outputting a signal indicative of engine coolant temperature and a pressure sensor for detecting a pressure differential across the trap which are electrically connected with said control means and output signals to said control means.

5. An exhaust gas purifying system as claimed in claim 4, further comprising means for determining that trap regeneration is required in response to the signal detected by the pressure sensor.

6. An exhaust gas purifying system as claimed in claim 1, wherein a fuel injection pump for the engine is used as said fuel supply means in a manner that the fuel injection pump carries out sub-injection in the end of a combustion stroke of the engine.

7. An exhaust gas purifying system as claimed in claim 1, wherein said control means includes a microcomputer in which a regenerating time is counted until a predetermined time when said trap is regenerated.

8. An exhaust gas purifying system as claimed in claim 2, wherein the predetermined temperature range corresponds to a range that is higher than the lower limit temperature of catalyzer activities of said catalytic converter and is lower than the lower limit of the regenerating gas temperature of said filter.

* * * * *